(12) United States Patent
Hudson, II et al.

(10) Patent No.: US 11,079,561 B2
(45) Date of Patent: Aug. 3, 2021

(54) FIRE RETARDANT AND LOW-SMOKE OPTICAL COMMUNICATIONS CABLE

(71) Applicant: Corning Optical Communications LLC, Hickory, NC (US)

(72) Inventors: Harold Edward Hudson, II, Conover, NC (US); William Carl Hurley, Hickory, NC (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/193,681

(22) Filed: Nov. 16, 2018

(65) Prior Publication Data

US 2019/0101715 A1     Apr. 4, 2019

Related U.S. Application Data

(63) Continuation of application No. PCT/US2017/037397, filed on Jun. 14, 2017.

(60) Provisional application No. 62/353,748, filed on Jun. 23, 2016.

(51) Int. Cl.
   G02B 6/44         (2006.01)

(52) U.S. Cl.
   CPC ......... G02B 6/4436 (2013.01); G02B 6/441 (2013.01); G02B 6/4434 (2013.01); G02B 6/4494 (2013.01)

(58) Field of Classification Search
   CPC ... G02B 6/4433; G02B 6/4494; G02B 6/4434
   USPC ....................................................... 385/103
   See application file for complete search history.

(56) References Cited

U.S. PATENT DOCUMENTS

| | | | | |
|---|---|---|---|---|
| 4,547,626 A | * | 10/1985 | Pedersen ................ | H01B 7/295 174/107 |
| 4,781,433 A | * | 11/1988 | Arroyo ................ | G02B 6/4403 264/1.28 |
| 5,444,809 A | * | 8/1995 | Aoki ...................... | C09K 21/12 252/609 |

(Continued)

FOREIGN PATENT DOCUMENTS

| | | |
|---|---|---|
| CN | 101619150 A | 1/2010 |
| CN | 101735546 A | 6/2010 |

(Continued)

OTHER PUBLICATIONS

NFPA 262, "Standard Method of Test for Flame Travel and Smoke of Wires and Cables for Use in Air-Handling Spaces", National Fire Protection Agency, Quincy, MA, 2002 Edition. (Year: 2002).*

(Continued)

*Primary Examiner* — Michelle R Connelly
(74) *Attorney, Agent, or Firm* — William D. Doyle (57) ABSTRACT

An optical communication cable is provided. The optical communication cable includes a cable jacket and a plurality of optical fiber subunits surrounded by the cable jacket. Each optical fiber subunit includes a subunit jacket and a plurality of optical fibers located within the subunit passage. Each optical fiber includes an outer polymer buffer coating, such as a tight buffer coating. The outer cable jacket and/or the outer polymer buffer coating of the optical fibers is formed from a halogen containing polymer material including a fire retardant material, and the subunit jacket is formed from a polyolefin polymer material including a fire retardant material.

20 Claims, 3 Drawing Sheets

(56) References Cited

U.S. PATENT DOCUMENTS

| | | | | |
|---|---|---|---|---|
| 6,167,178 | A * | 12/2000 | Nave | G02B 6/4436 385/100 |
| 6,301,413 | B1 * | 10/2001 | Bringuier | G02B 6/4436 385/100 |
| 6,453,097 | B1 | 9/2002 | Newton et al. | |
| 6,701,047 | B1 * | 3/2004 | Rutterman | G02B 6/4413 385/102 |
| 6,701,347 | B1 * | 3/2004 | Ogilvie | G06Q 10/107 709/202 |
| 8,582,941 | B2 | 11/2013 | Conrad et al. | |
| 8,855,455 | B2 | 10/2014 | Keller et al. | |
| 10,534,149 | B2 * | 1/2020 | Baetz | G02B 6/4496 |
| 2003/0099446 | A1 * | 5/2003 | Witt | G02B 6/4495 385/109 |
| 2003/0180017 | A1 * | 9/2003 | Hayano | G02B 6/4436 385/100 |
| 2009/0022462 | A1 | 1/2009 | Papazoglou et al. | |
| 2009/0098401 | A1 * | 4/2009 | Yamaki | B29D 11/00721 428/542.8 |
| 2009/0129736 | A1 * | 5/2009 | Sato | B29C 41/003 385/124 |
| 2010/0101822 | A1 * | 4/2010 | Bunker | C08L 51/06 174/110 SR |
| 2011/0262148 | A1 | 10/2011 | Weimann | |
| 2013/0129290 | A1 | 5/2013 | Keller et al. | |
| 2015/0131952 | A1 * | 5/2015 | Gallo | G02B 6/4436 385/102 |
| 2015/0268427 | A1 * | 9/2015 | Register, III | G02B 6/441 385/110 |
| 2018/0231729 | A1 * | 8/2018 | Baetz | G02B 6/4435 |

FOREIGN PATENT DOCUMENTS

| | | |
|---|---|---|
| CN | 103064163 A | 4/2013 |
| CN | 203405610 U | 1/2014 |
| EP | 1041420 A1 | 10/2000 |
| JP | 2000021243 A * | 1/2000 |
| JP | 2000026664 A * | 1/2000 |
| WO | 2015142783 A1 | 9/2015 |

OTHER PUBLICATIONS

International Search Report and Written Opinion of the International Searching Authority; PCT/US2018/037397; dated Sep. 13, 2017; 13 Pages.

Chinese Patent Application No. 201780045570.4; English Translation of the Office Action dated Dec. 20, 2019; China Patent Office; 8 pgs.

* cited by examiner

FIRE RETARDANT AND LOW-SMOKE OPTICAL COMMUNICATIONS CABLE

CROSS-REFERENCE TO RELATED APPLICATIONS

This application claims the benefit of priority to International Application No. PCT/US17/37397 filed on Jun. 14, 2017, which claims the benefit of priority to U.S. Provisional Application No. 62/353,748, filed on Jun. 23, 2016, both applications being incorporated herein by reference.

BACKGROUND

The disclosure relates generally to optical communication cables and more particularly to fire retardant indoor and indoor/outdoor optical communication cables. Optical communication cables have seen increased use in a wide variety of electronics and telecommunications fields. Optical communication cables contain or surround one or more optical communication fibers. The cable provides structure and protection for the optical fibers within the cable.

SUMMARY

One embodiment of the disclosure relates to a fire retardant and low smoke optical communication cable. The cable includes a cable jacket and a plurality of optical fiber subunits surrounded by the cable jacket. Each optical fiber subunit includes a subunit jacket defining a subunit passage and a plurality of tight buffered optical fibers located within the subunit passage. Each optical fiber includes a glass core and a polymer tight buffer coating surrounding the glass core. The polymer tight buffer coating has an outer diameter greater than 400 µm. The cable jacket is formed from a halogen containing polymer material including a fire retardant material. The polymer tight buffer coating of each optical fiber is formed from a halogen containing polymer material including a fire retardant material. Each subunit jacket is formed from a non-halogen containing polymer material including a fire retardant material. The optical communication cable is plenum burn test rated as described in NFPA 262 utilizing the Steiner Tunnel burn test.

An additional embodiment of the disclosure relates to an optical communication cable. The cable includes an outer cable jacket including an outer surface defining the outermost surface of the cable and a plurality of optical fiber subunits surrounded by the outer cable jacket. Each optical fiber subunit includes a subunit jacket defining a subunit passage and a plurality of optical fibers located within the subunit passage. Each optical fiber includes an outer polymer buffer coating having an outer diameter of at least 400 µm. The outer cable jacket is formed from a halogen containing polymer material including a fire retardant material. The subunit jacket is formed from a polyolefin polymer material including a fire retardant material. The optical communication cable is plenum burn test rated as described in NFPA 262 utilizing the Steiner Tunnel burn test.

An additional embodiment of the disclosure relates to a plenum rated, fire retardant and low smoke optical communication cable. The cable includes an outer cable jacket including an outer surface defining the outermost surface of the cable and a central strength member surrounded by the outer cable jacket. The central strength member includes a tensile strength element and a polymer overcoat layer surrounding the tensile strength member. The cable includes a plurality of optical fiber subunits located around the central strength member within the outer cable jacket. Each optical fiber subunit includes a subunit jacket defining a subunit passage and a plurality of optical fibers located within the subunit passage. Each optical fiber includes a glass core and a polymer buffer coating surrounding the glass core and having an outer diameter greater than 400 µm. The number of optical fiber subunits is at least three and the number of optical fibers in each subunit is at least two. The outer cable jacket is formed from a polyvinylchloride material including a fire retardant material. The polymer buffer coating is formed from a polyethylene material including a fire retardant material. The subunit jacket is formed from a polyethylene material including a fire retardant material. The polymer overcoat layer is formed from a polyvinylchloride material including a fire retardant material. The optical communication cable is plenum burn test rated as described in NFPA 262 utilizing the Steiner Tunnel burn test.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a fire retardant and/or low smoke optical communication cable (e.g., a plenum burn test rated optical cable) are shown and described. In general, the cable embodiments disclosed herein utilize an innovative combination of fire retardant (FR) polymer materials and smoke limiting polymer materials to form the various polymer structures of the optical cable. Specifically, Applicant has developed a cable design in which one or more burn-test related property is provided by select polymer materials that are specifically selected for use at positions or layers within the cable design to improve burn test performance.

Despite conventional wisdom that large amounts or exclusive use of halogen containing polymer materials (e.g., polyvinylchloride (PVC) and/or polyvinylidene difluoride (PVDF)) are needed to provide an optical cable having flame spread and smoke production properties needed to pass plenum burn testing, the cable design discussed herein achieves a plenum burn rated cable without relying solely on the halogen based polymers, PVC and PVDF. Specifically, Applicant has identified that FR low smoke, zero halogen materials (e.g., LSZH material, FR polyethylene) produce very low amounts of smoke compared to halogen based polymers, such as PVC, but on the other hand certain halogen containing materials, such as FR PVC, provide excellent limitation to flame spread along a cable as compared to FR zero halogen materials such as FR polyethylene.

Thus, Applicant has developed a cable design, as discussed herein, that utilizes an FR low or zero halogen containing polymer material (e.g., an FR polyolefin, an FR polyethylene, an FR polypropylene, etc.) for various internal polymer layers of the cable, and a halogen containing polymer material (e.g., a polyvinylchloride (PVC)) for the outer cable jacket. In this arrangement, the FR zero halogen material provides low smoke production characteristics inside the cable jacket, and the halogen containing polymer material outer jacket acts to limit flame spread along the length of the cable. Thus, the cable design discussed herein utilizes a low flame spread material (e.g., FR PVC) as an outer cable layer to block and limit flame spread that may otherwise be generated by the internal FR low smoke material, zero halogen material, and which also utilizes an inherently low smoke producing polymer material within the cable jacket with results in a cable design that provides satisfactory smoke production. Thus, by balancing and specifically locating the higher flame spread but low smoke, zero halogen material on the inside of the cable and locating the relatively high smoke, but low flame spread material as the outer jacket, Applicant has developed a cable design which passes plenum burn testing without reliance solely on halogen containing polymers.

In addition, Applicant has found that the cable design herein enables formation of a cable that does not necessarily rely on an ammonium octamolybdate (AOM) smoke suppressing material located in the outer jacket material or in the subunit jacket material to provide the needed limitation on smoke production. Instead, the cable design discussed herein utilizes inner layers of low smoke, zero halogen materials which produce low amounts of smoke without the addition of an AOM smoke suppressant additive. In such embodiments, an improved indoor/outdoor cable is provided through the inclusion of water blocking, superabsorbent polymer (SAP) material, which is incompatible with smoke suppression materials, such as ammonium octamolybdate (AOM), that are typically found in conventional plenum burn rated tight buffered fiber cables.

Figure 1:
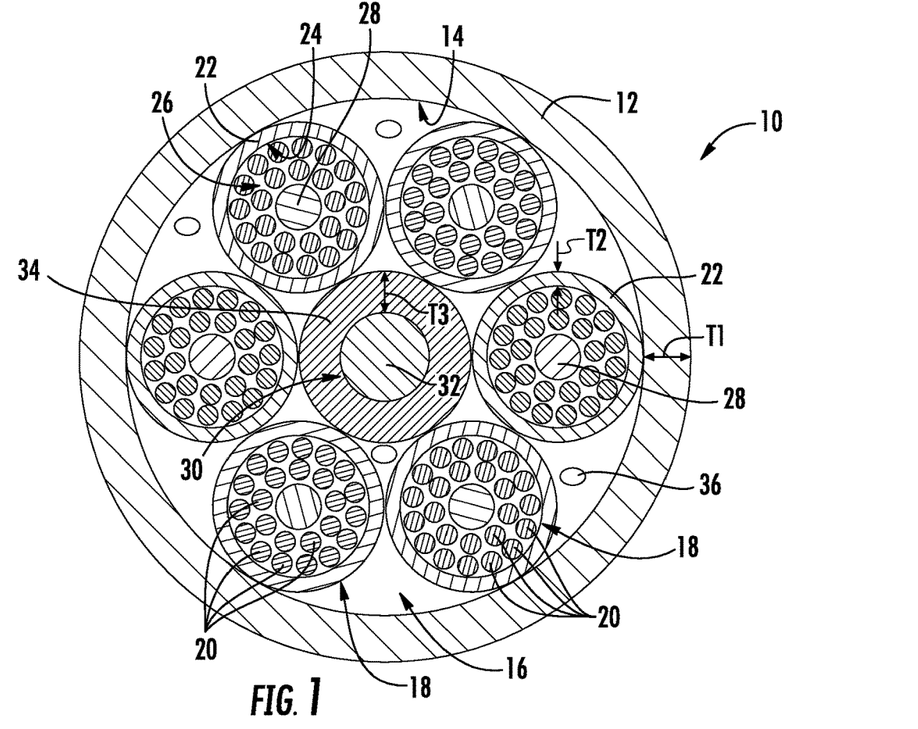
FIG. 1 is a cross-sectional view of a fire retardant optical fiber cable according to an exemplary embodiment.

Referring to FIG. 1, an optical communication cable, shown as cable 10, is shown according to an exemplary embodiment. Cable 10 includes a cable jacket or layer, shown as outer cable jacket 12, having an inner surface 14 that defines an inner passage or cavity, shown as central bore 16. As will be generally understood, inner surface 14 of outer jacket 12 defines an internal area or region within which the various cable components discussed below are located. As will be explained in more detail below, cable jacket 12 is formed from a polymer material specifically selected to limit flame spread along cable 10 in the event of a fire.

In various embodiments, cable 10 includes a relatively large number of optical fibers supported within or organized into subunits 18. In general, each subunit 18 includes a plurality of individual elongate optical fibers, shown as tight buffered optical fibers 20. In various embodiments, cable 10 includes 3-24 subunits 18, and each subunit 18 includes 2-24 individual tight buffered optical fibers 20. In the specific embodiment shown, cable 10 includes 6 subunits 18, each including 24 tight buffered optical fibers 20.

As shown in FIG. 1, each subunit 18 includes a subunit jacket 22 that has an inner surface 24 that defines a subunit passage or bore 26. Tight buffered optical fibers 20 are located within subunit jacket 22 and surround a subunit strength member 28. In specific embodiments, tight buffered optical fibers 20 may be stranded (e.g., wrapped in a pattern such as a helical pattern or an S-Z stranding pattern) around subunit strength member 28. In other embodiments, tight buffered optical fibers 20 are not stranded within subunit jackets 22. In various embodiments, subunit jackets 22 are a relatively thin, flexible layer of polymer material that surrounds tight buffered optical fibers 20. In addition, each subunit 18 may also include other components, such as water blocking powder, water blocking yarns, etc., within subunit jacket 22, as may be needed for various applications.

In other embodiments, cable 10 may support various numbers of subunits 18 each including various numbers of tight buffered optical fibers 20. In various embodiments, cable 10 may include 6, 8, 10, 12, 14, 16, 18, 20, etc. subunits 18, and each subunit 18 may include 2, 4, 6, 8, 10, 12, 14, 16, 20, 24, 28, 32, etc. tight buffered optical fibers 20. In specific embodiments, cable 10 includes 144 tight buffered optical fibers 20, and in another embodiment, cable 10 includes 288 tight buffered optical fibers 20.

In various embodiments, subunits 18 are positioned around a central strength member 30 within outer jacket 12. As shown in FIG. 1, central strength member 30 includes a central strength element 32 surrounded by an overcoat layer 34. In various embodiments, central strength element 32 is a tensile strength element, such as a glass-reinforced plastic rod (GRP), steel rod/wire, etc., and overcoat layer 34 is a polymer layer surrounding the outer surface of central strength element 32.

In specific embodiments, overcoat layer 34 is a flexible polymer support layer that increases the diameter of central strength member 30, which facilitates wrapping of a large number of subunits 18 around central strength member 30 without significantly increasing the rigidity of central strength member 30 (as would be the case using a larger diameter GRP rod or metal wire). In specific embodiments, cable 10 utilizing a GRP or metal wire central strength member 30 is intended for outdoor or indoor/outdoor applications in which the relatively rigid strength member resists cable shrinkage at temperatures down to negative 40 degrees C. In some embodiments, in which cable 10 is an indoor cable, central strength member 30 may be a yarn based strength member, and in one such embodiment, the yarn based strength member includes one or more aramid yarn strand.

In addition to central strength member 30 and subunits 18, cable 10 may include a variety of other components located within cable jacket 12. For example, cable 10 includes water blocking members 36, such as yarn fibers supporting SAP polymers, that act to block migration of water within outer jacket 12. In such embodiments, water blocking member 36 allows cable 10 to function as an outdoor cable or an indoor/outdoor cable. In other embodiments intended for indoor use, cable 10 does not include water blocking members 36. In various embodiments, cable 10 may include a variety of other components or layers, such as helically wrapped binders, circumferential constrictive thin-film binders, water blocking tape materials, etc., as needed for a particular cable application.

Figure 2:
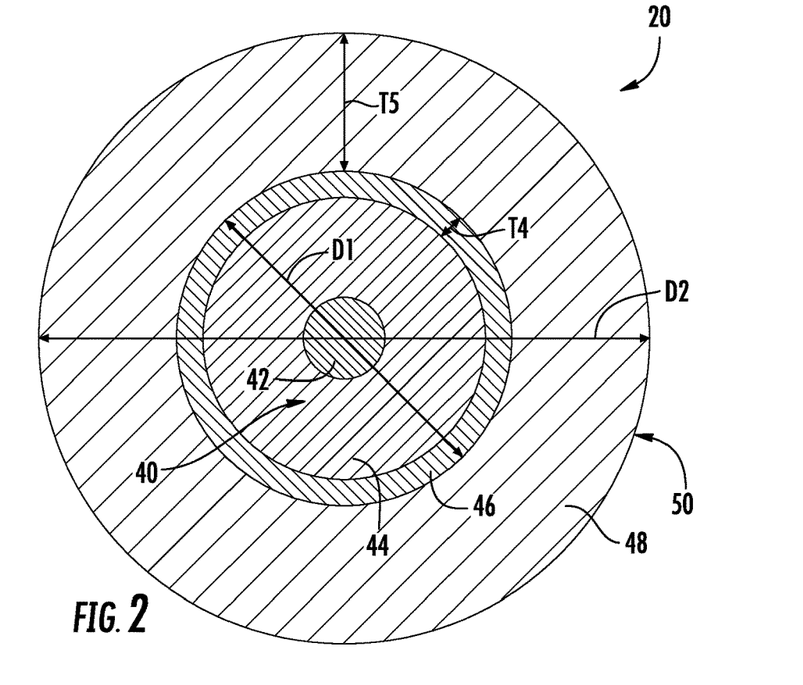
FIG. 2 is a detailed cross-sectional view of an optical fiber of the cable of FIG. 1, according to an exemplary embodiment.

Referring to FIG. 2, a detailed view of optical fiber 20 is shown according to an exemplary embodiment. Each optical fiber 20 includes a central portion 40 formed from a glass material. As will generally be understood, central glass portion 40 of optical fiber 20 includes an optically transmitting optical core 42 and one or more cladding layer(s) 44. Optical core 42 is formed from a material that transmits light, and optical core 42 is surrounded by a cladding layer(s) 44 that has a different refractive index (e.g., a lower refractive index) than the optical core 42 such that the optical fiber acts as a waveguide that retains a light signal within optical core 42.

Tight buffered optical fibers 20 each include an inner coating layer, shown as primary coating layer 46. Primary coating layer 46 surrounds both optical core 42 and cladding layer 44. In the embodiment shown, primary coating layer 46 is a layer formed from a material, such as an ultraviolet curable acrylate material, that provides protection (e.g., protection from scratches, chips, etc.) to tight buffered optical fibers 20.

In the embodiment shown in FIGS. 1 and 2, optical fibers 20 are tight buffered optical fibers having an outer buffer coating, shown as outer coating layer 48, located outside of and surrounding primary coating layer 46. In general, outer coating layer 48 is formed from a polymer material (e.g., a thermoplastic polymer material) that is coupled to primary coating layer 46. Outer coating layer 48 provides an additional layer of protection to optical fiber 20. In this arrangement, primary coating layer 46 has an inner surface that contacts and is coupled (e.g., via friction) to the outer surface of cladding layer 44. Coating layer 46 also has an outer surface that contacts and is coupled to an inner surface of outer coating layer 48, and outer coating layer 48 has an outer surface 50 that defines the outer or exterior surface of each tight buffered optical fiber 20.

As noted above, various polymer layers of cable 10, and specifically outer cable jacket 12, subunit jacket 22, strength member overcoat 34 and fiber outer coating layer 48, are formed from specifically selected FR polymer materials that Applicant has identified as providing the desired burn test performance (e.g., plenum burn test rated) without solely relying on halogen based polymer materials, such as PVC and PVDF. Applicant believes that in some embodiments, such as those utilizing tight buffered optical fibers 20 including outer coating layer 48, cable 10 is a difficult cable to design to be plenum burn rated due to the relatively large amount of combustible polymer within cable 10 (e.g., from tight buffered layers, strength member overcoats, subunit jackets, etc.), and conventional cable designs for tight buffered optical fibers rely on expensive materials such as FR PVC and PVDF and AOM, to achieve the desired burn rating. In contrast, cable 10 as developed by the Applicant achieves plenum burn rating using FR polyolefins for one or more layer of cable 10.

Specifically, in various embodiments, subunit jacket 22 and/or strength member overcoat 34 are formed from an FR low or zero halogen polymer material, such as an FR polyolefin material. In specific embodiments, subunit jacket 22 and/or strength member overcoat 34 are formed from an FR polyethylene material, such as Megolon 8553 available from Mexichem Specialty Compounds. In addition, outer jacket 12 and/or fiber outer coating layer 48 is formed from an FR halogen containing polymer material, and specifically is formed from an FR PVC material. In other embodiments, fiber outer coating layer 48 is formed from LSZH (e.g., FR polyethylene), nylon and/or polyester materials.

In various embodiments, the polymer material of subunit jacket 22 and/or strength member overcoat 34 is a fire resistant material having one or more of the following properties: a polyolefin base resin, metal oxide fire retardant(s), limiting oxygen index (LOI) greater than 40 and/or specific gravity greater than 1.50. In various embodiments, the polymer material of outer jacket 12 and/or fiber outer coating layer 48 is a fire resistant material having one or more of the following properties: a PVC base resin, metal oxide fire retardant(s), LOI greater than 48 and/or a specific gravity greater than 1.55.

Applicant has found that this arrangement leverages the low flame propagation characteristics of the FR halogen material, specifically FR PVC, of outer jacket 12 and/or fiber outer coating layer 48 to limit flame spread along cable 10 and leverages the low smoke production characteristics of the FR polyolefin, specifically FR polyethylene, of subunit jacket 22 and/or strength member overcoat 34. Applicant has determined that this arrangement provides a cable 10 that is a fire resistant cable suitable for indoor or indoor/outdoor use. In specific embodiments, cable 10 as discussed herein passes the plenum burn test defined in NFPA 262 utilizing the Steiner Tunnel burn test.

In contrast to the designs discussed herein, it is Applicant's understanding that many conventional plenum rated, tight buffered optical fiber cables utilize FR PVC for strength member coatings, tight buffer coatings and fiber subunits and utilize either an FR PVC outer jacket in combination with an AOM smoke suppressant additive or an FR PVDF outer jacket without a smoke suppressant in order to provide a high burn performance (e.g., a plenum rated) cable. Applicant's design by utilizing some low smoke, zero halogen material (e.g., FR polyethylene) in conjunction with FR PVC without AOM as an outer jacket material enables cable formation from a wider range of materials, and with lower cost materials, than believed achievable previously. This is particularly true in the case of a tight buffered fiber cable such as cable 10, because the tight buffer layer adds significant amounts of combustible polymer material to the interior of the cable, which has typically been addressed in the optical fiber cable industry through the exclusive use of high cost, high burn performance polymer materials, such as PVC with AOM and PVDF, for such optical cables.

In a specific embodiment, cable 10 is an indoor/outdoor cable which passes the plenum burn test defined in NFPA 262 and does not include AOM smoke suppressant and which does not rely on PVDF outer jacket to provide desired smoke abatement performance. In this embodiment, cable 10 allows for use of the more economical PVC (as compared to PVDF) as the outer jacket 12 but also avoids the use of AOM which is incompatible with SAP water blocking materials, and thus in such embodiments, cable 10 includes SAP materials within the material of outer jacket 12, within central bore 16, within the material of subunit jackets 22 and/or within subunit bore 26, and in such embodiments, SAP may be any SAP used for cable water-blocking applications such, as polyacrylate particles.

In addition to the material types and material properties discussed herein, the various polymer layers discussed herein are sized to provide cable 10 with the desired burn performance characteristics. As shown in FIG. 1, outer jacket 12 has an average thickness T1, and T1 is between 0.5 mm and 3 mm, specifically is between 1.0 mm and 2.0 mm and more specifically is about 1.5 mm (1.5 mm plus or minus 0.35 mm). Subunit jacket 22 has an average thickness T2, and T2 is between 0.1 mm and 1.0 mm, specifically is between 0.2 mm and 0.8 mm and more specifically is about 0.5 mm (e.g., 0.5 mm plus or minus 1%). In some specific embodiments, T2 is about 0.3 mm (e.g., 0.3 mm plus or minus 1%). Strength member overcoat layer 34 has an average thickness T3 between 1 mm and 3 mm.

As shown in FIG. 2, primary coating layer 46 has an outer diameter D1 and a thickness T4, and outer coating layer 48 defines an outer fiber diameter D2, and a thickness T5. In various embodiments, D1 is between 150 µm and 300 µm, specifically between 200 µm and 260 µm, and more specifically about 250 µm (e.g., 250 µm plus or minus 2%), and T4 is between 10 µm and 100 µm, specifically between 40 µm and 70 µm and more specifically is about 62.5 µm (e.g., 62.5 µm plus or minus 1%). In various embodiments, D2 is greater than 250 µm, specifically is greater than 400 µm, more specifically between 400 µm and 1.5 mm. In a specific embodiment, D2 is between 700 µm and 1.1 mm and more specifically about 900 µm (e.g., 900 µm plus or minus 6%). In another specific embodiment, D2 is between 300 µm and 700 µm and more specifically about 500 µm (e.g., 500 µm plus or minus 10%). T5 is between 100 µm and 500 µm, specifically between 300 µm and 400 µm and more specifically about 375 µm (e.g., 375 µm plus or minus 10%).

The various polymer materials of outer cable jacket 12, subunit jacket 22, strength member overcoat 34 and fiber outer coating layer 48 are formed from an FR polymer material as discussed above. In particular, embodiments, these FR polymer materials are extrudable polymer materials that include one or more material, additive or component embedded in the polymer material that provides fire resistant characteristics such as relatively low heat generation, char layer formation, low flame propagation, low smoke production, etc. In various embodiments, the fire resistant material may include an intumescent material additive embedded in the polymer material and/or a non-intumescent fire resistant material embedded in the polymer material, such as a metal hydroxide, aluminum hydroxide, magnesium hydroxide, etc., that produces water in the presence of heat/fire which slows or limits heat transfer through cable 10 which in turn limits heat generation and flame propagation along cable 10. In certain embodiments, the fire resistant material of outer cable jacket 12, subunit jacket 22, strength member overcoat 34 and/or fiber outer coating layer 48 may be a highly-filled polymer material with a limiting oxygen index (LOI) of 40 or higher. In various embodiments, the fire resistant material of outer cable jacket 12, subunit jacket 22, strength member overcoat 34 and/or fiber outer coating layer 48 may include other additives in addition to the fire resistant materials, such coloring materials or UV/light blocking (e.g., carbon black) materials.

Figure 3:
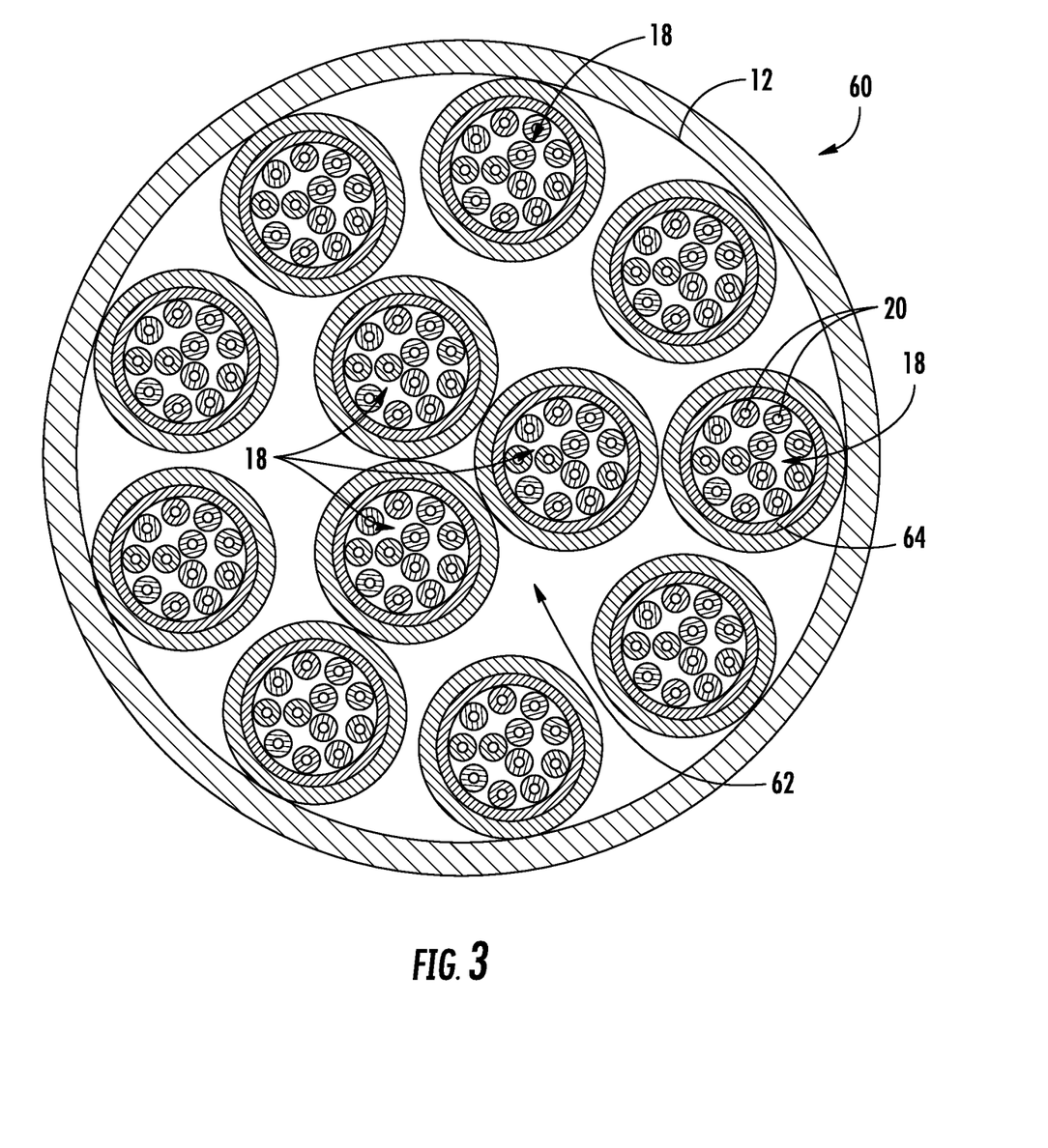
FIG. 3 is a cross-sectional view of a fire retardant optical fiber cable according to another exemplary embodiment.

Referring to FIG. 3, an optical communication cable, such as cable 60, is shown according to an exemplary embodiment. Cable 60 is substantially the same as cable 10 except as discussed herein. As shown, cable 60 includes a central group 62 of subunits 18, and in this embodiment, cable 60 does not include a central strength element. In addition, as noted above, cable 60 includes one or more additional layer, shown as water blocking layer 64, located within each subunit 18.

Figure 4:
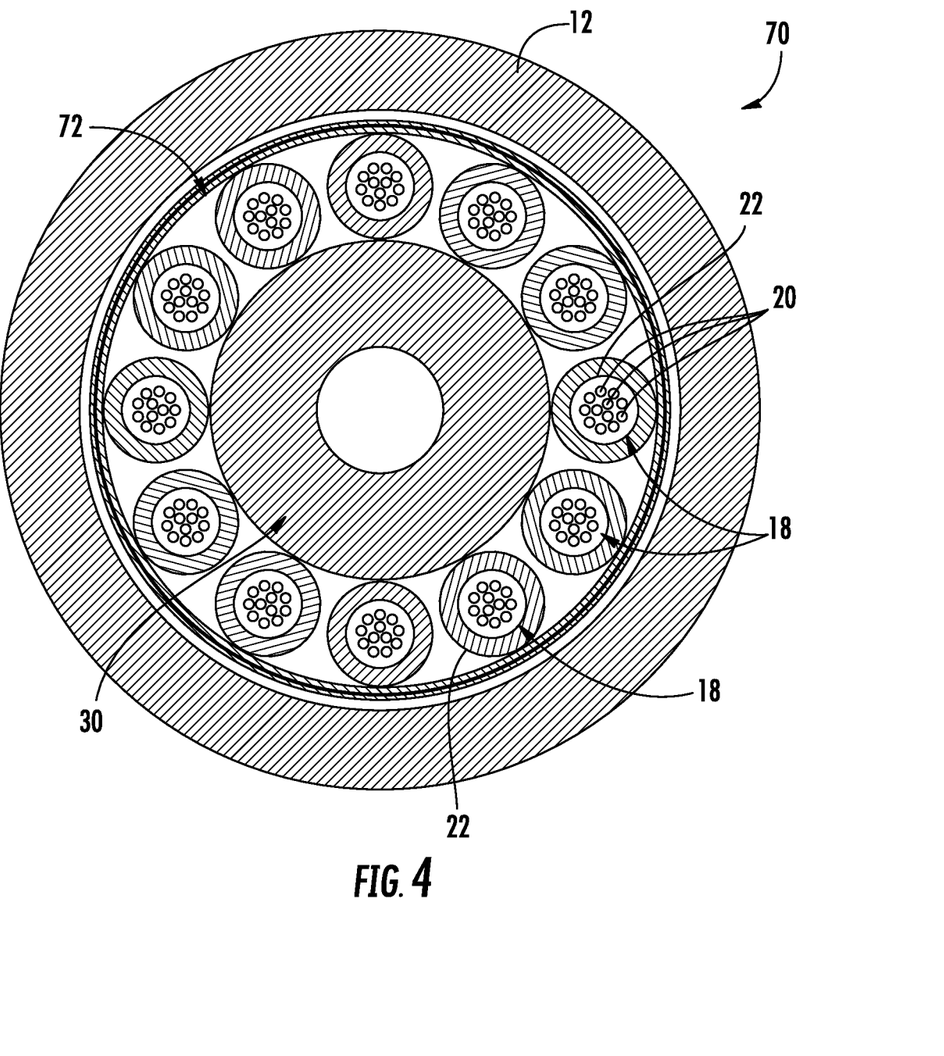
FIG. 4 is a cross-sectional view of a fire retardant optical fiber cable according to another exemplary embodiment.

Referring to FIG. 4, an optical communication cable, such as cable 70, is shown according to an exemplary embodiment. Cable 70 is substantially the same as cable 10 except as discussed herein. As shown, cable 70 includes a plurality of subunits 18 located within cable jacket 12. In this embodiment, subunits 18 do not include central strength elements within subunit jacket 22, and in some such embodiments, tight buffered optical fibers 20 are located unstranded within subunit jacket 22. In addition, as shown in FIG. 4, cables discussed herein may include one or more additional layer 72, which may include an armor layer, water blocking tape layer, binder layer, etc.

While the specific cable embodiments discussed herein and shown in the figures relate primarily to cables and subunits that have a substantially circular cross-sectional shape defining substantially cylindrical internal bores, in other embodiments, the cables and subunits discussed herein may have any number of cross-section shapes. For example, in various embodiments, cable jacket 12 and/or subunit sheath 22 may have an oval, elliptical, square, rectangular, triangular or other cross-sectional shape. In such embodiments, the passage or lumen of the cable jacket 12 and/or subunit jacket 22 may be the same shape or different shape than the shape of cable jacket 12 and/or subunit jacket 22. In some embodiments, cable jacket 12 and/or subunit jacket 22 may define more than one channel or passage. In such embodiments, the multiple channels may be of the same size and shape as each other or may each have different sizes or shapes.

The optical fibers discussed herein include optical fibers that are flexible, transparent optical fibers made of glass or plastic. The fibers function as a waveguide to transmit light between the two ends of the optical fiber. Optical fibers include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In various embodiments, the optical fibers may be bend insensitive optical fibers or multi-core optical fibers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A fire retardant and low smoke optical communication cable, comprising:
   a cable jacket;
   a plurality of optical fiber subunits surrounded by the cable jacket, each optical fiber subunit comprising:
   a subunit jacket defining a subunit passage; and
   a plurality of tight buffered optical fibers located within the subunit passage, each optical fiber comprising:
   a glass core; and
   a polymer tight buffer coating surrounding the glass core, the polymer tight buffer coating having an outer diameter greater than 400 μm;
   wherein the cable jacket is formed from a halogen containing polymer material including a fire retardant material;
   wherein the polymer tight buffer coating of each optical fiber is formed from a halogen containing polymer material including a fire retardant material; and
   wherein each subunit jacket is formed from a non-halogen containing polymer material comprising a polyolefin base resin and at least one metal hydroxide fire retardant, wherein the at least one metal hydroxide fire retardant produces water in the presence of fire and/or heat;
   wherein the optical communication cable is plenum burn test rated as described in NFPA 262 utilizing the Steiner Tunnel burn test.

2. The optical communication cable of claim 1, further comprising a central strength member surrounded by the cable jacket, wherein the central strength member has a polymer overcoat layer surrounding a tensile strength element, and the polymer overcoat layer is formed of a non-halogen containing material.

3. The optical communication cable of claim 2, wherein the halogen containing polymer material of both the cable jacket and the polymer tight buffer coating is a PVC material.

4. The optical communication cable of claim 3, wherein the non-halogen containing polymer material of both the subunit jackets and the polymer overcoat layer is an extrudable polyolefin material.

5. The optical communication cable of claim 4, wherein the polyolefin material of both the subunit jackets and the polymer overcoat layer is a polyethylene material.

6. The optical communication cable of claim 5, wherein the fire retardant materials of the polymer materials of the cable jacket, the subunit jackets, the polymer overcoat layer and the polymer tight buffer coatings include at least one of an intumescent material and a metal hydroxide material.

7. The optical communication cable of claim 1, further comprising a superabsorbent polymer water blocking material within the cable jacket, wherein the halogen containing polymer materials of the cable jacket and of the polymer tight buffer coating does not include an ammonium octamolybdate (AOM) smoke suppressant additive.

8. The optical communication cable of claim 1, wherein the halogen containing polymer material of the cable jacket includes an ammonium octamolybdate (AOM) smoke suppressant additive and the cable does not include a superabsorbent polymer water blocking material within the cable jacket.

9. The optical communication cable of claim 1, wherein the number of optical fiber subunits is 3 to 18 and the number of optical fibers in each optical fiber subunit is 2 to 24.

10. The optical communication cable of claim 1, wherein the cable jacket has a thickness between 0.5 mm and 3 mm, the subunit jacket has thickness between 0.3 mm and 0.9 mm and the polymer tight buffer coating has a thickness between 0.12 mm and 0.4 mm.

11. The optical communication cable of claim 1, wherein each optical fiber subunit includes a subunit tensile strength member located within the subunit jacket, wherein the optical fibers of each optical fiber subunit are located around the subunit tensile strength member within the subunit jacket, wherein the cable jacket is an outer cable jacket including an outer surface defining the outermost surface of the cable.

12. An optical communication cable, comprising:
    an outer cable jacket including an outer surface defining the outermost surface of the cable;
    a plurality of optical fiber subunits surrounded by the outer cable jacket, each optical fiber subunit comprising:
    a subunit jacket defining a subunit passage; and
    a plurality of optical fibers located within the subunit passage, each optical fiber including an outer polymer buffer coating having an outer diameter of at least 400 μm;
    wherein the outer cable jacket is formed from a halogen containing polymer material including a fire retardant material;
    wherein the subunit jacket is formed from a polyolefin polymer material including a fire retardant material comprising at least one metal hydroxide fire retardant, wherein the at least one metal hydroxide fire retardant produces water in the presence of fire and/or heat;
    wherein the optical communication cable is plenum burn test rated as described in NFPA 262 utilizing the Steiner Tunnel burn test.

13. The optical communication cable of claim 12, wherein each optical fiber comprises:
    a glass core;
    a cladding layer surrounding the glass core; and
    a polymer inner coating surrounding the cladding layer;
    wherein the outer polymer buffer coating surrounds the polymer inner coating, wherein the polymer coating is formed from a halogen containing polymer material including a fire retardant material.

14. The optical communication cable of claim 13, further comprising:
    a central strength member surrounded by the outer cable jacket, the central strength member including an outer polymer overcoat surrounding and coupled to a tensile strength element, wherein the outer polymer overcoat is formed from a polyolefin polymer material including a fire retardant material;
    a subunit strength element located within the subunit passage of each optical fiber subunit, wherein the plurality of optical fibers are located around the subunit strength element.

15. The optical communication cable of claim 14, wherein the polyolefin polymer material of both the subunit jacket and the outer polymer overcoat is an extrudable polyethylene material and wherein the halogen containing polymer material of both the outer cable jacket and the outer polymer buffer coating of each optical fiber is a PVC material.

16. The optical communication cable of claim 15, wherein the polymer material of at least one of the outer cable jacket, the outer polymer overcoat of the central strength member, the subunit jacket and the outer polymer buffer coating of each optical fiber has a limiting oxygen index (LOI) of 40 or higher.

17. The optical communication cable of claim 14, wherein the fire retardant materials of the polymer materials of the outer cable jacket, the subunit jacket, the outer polymer overcoat of the central strength member and the outer polymer buffer coating of each optical fiber includes at least one of an intumescent material and a metal hydroxide material.

18. The optical communication cable of claim 14, wherein the polymer material of the outer cable jacket is a PVC material and does not include an ammonium octamolybdate (AOM) smoke suppressant additive.

19. The optical communication cable of claim 12, wherein the number of optical fiber subunits is 3 to 18 and the number of optical fibers in each subunit is 2 to 24.

20. A plenum rated, fire retardant and low smoke optical communication cable comprising:
- an outer cable jacket including an outer surface defining the outermost surface of the cable;
- a central strength member surrounded by the outer cable jacket, the central strength member comprising:
- a tensile strength element; and
- a polymer overcoat layer surrounding the tensile strength member; and
- a plurality of optical fiber subunits located around the central strength member within the outer cable jacket, each optical fiber subunit comprising:
- a subunit jacket defining a subunit passage; and
- a plurality of optical fibers located within the subunit passage, each optical fiber comprising:
- a glass core; and
- a polymer buffer coating surrounding the glass core and having an outer diameter greater than 400 µm;
wherein the number of optical fiber subunits is at least three and the number of optical fibers in each subunit is at least two;
wherein the outer cable jacket is formed from a polyvinylchloride material including a fire retardant material;
wherein the polymer buffer coating is formed from a polyethylene material including a fire retardant material;
wherein the subunit jacket is formed from a polyethylene material including a fire retardant material comprising at least one metal oxide fire retardant;
wherein the polymer overcoat layer is formed from a polyvinylchloride material including a fire retardant material;
wherein the optical communication cable is plenum burn test rated as described in NFPA 262 utilizing the Steiner Tunnel burn test.

\* \* \* \* \*

UNITED STATES PATENT AND TRADEMARK OFFICE
CERTIFICATE OF CORRECTION

Page 1 of 1

PATENT NO. : 11,079,561 B2
APPLICATION NO. : 16/193681
DATED : August 3, 2021
INVENTOR(S) : Hudson, II et al.

It is certified that error appears in the above-identified patent and that said Letters Patent is hereby corrected as shown below:

On the Title Page

On page 2, in Column 2, item (56), Other Publications, Line 2, delete "PCT/US2018/037397;" and insert -- PCT/US2017/037397; --, therefor.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*